US011113624B2

(12) United States Patent
Liu et al.

(10) Patent No.: US 11,113,624 B2
(45) Date of Patent: Sep. 7, 2021

(54) DISTRIBUTED MACHINE LEARNING ON HETEROGENEOUS DATA PLATFORMS

(71) Applicant: SAP SE, Walldorf (DE)

(72) Inventors: Chengyu Liu, Shanghai (CN); Lian Yang, Shanghai (CN); Xingtian Shi, Shanghai (CN)

(73) Assignee: SAP SE, Walldorf (DE)

( * ) Notice: Subject to any disclaimer, the term of this patent is extended or adjusted under 35 U.S.C. 154(b) by 1092 days.

(21) Appl. No.: 15/648,121

(22) Filed: Jul. 12, 2017

(65) Prior Publication Data

US 2019/0019104 A1    Jan. 17, 2019

(51) Int. Cl.
*G06N 99/00* (2019.01)
*G06N 7/00* (2006.01)
*G06F 12/10* (2016.01)
*G06N 20/00* (2019.01)
*G06F 9/46* (2006.01)

(52) U.S. Cl.
CPC .............. *G06N 20/00* (2019.01); *G06F 9/46* (2013.01)

(58) Field of Classification Search
CPC ................................. G06N 20/00; G06F 9/46
USPC ...................................................... 706/1–62
See application file for complete search history.

(56) References Cited

U.S. PATENT DOCUMENTS

| | | | | |
|---|---|---|---|---|
| 9,715,496 | B1 * | 7/2017 | Sapoznik | G06N 3/08 |
| 10,445,356 | B1 * | 10/2019 | Mugan | G06F 16/334 |
| 2008/0183647 | A1 * | 7/2008 | Hawkins | G06N 3/08 |
| | | | | 706/12 |
| 2015/0242769 | A1 * | 8/2015 | Kezeu | G06Q 10/06314 |
| | | | | 705/7.11 |
| 2015/0269120 | A1 * | 9/2015 | Nakatsugawa | G06K 9/00 |
| | | | | 703/2 |
| 2016/0026930 | A1 * | 1/2016 | Cheng | G06N 5/02 |
| | | | | 706/11 |
| 2016/0094274 | A1 * | 3/2016 | Sundaresan | H04L 43/0888 |
| | | | | 375/257 |
| 2016/0170896 | A1 * | 6/2016 | Steiss | G06F 12/109 |
| | | | | 711/154 |
| 2016/0359740 | A1 * | 12/2016 | Parandehgheibi | G06F 16/285 |

(Continued)

*Primary Examiner* — Brandon S Cole
(74) *Attorney, Agent, or Firm* — Fountainhead Law Group P.C.

(57) ABSTRACT

A distributed machine learning framework implemented with heterogeneous data platforms reduces data copying and exploits memory/computation resources of the different data platforms. A configuration component includes information to set up the system. A persistency component manages storage of data and a model trained by machine learning. A proxy repository includes predefined proxies for communication between heterogeneous data platform nodes and execution of the machine learning procedure. A machine learning execution component comprises three layers. A bottom work node layer within the data platform performs computations of the machine learning procedure. A middle server node layer comprising one server node per data platform, communicates with the work nodes to coordinate jobs on that data platform. An upper layer comprises a central server node communicating with server nodes and coordinating jobs of the different platforms. The system can extend to additional external data platforms and external machine learning libraries with predefined proxies.

19 Claims, 9 Drawing Sheets

(56) References Cited

U.S. PATENT DOCUMENTS

2017/0039487 A1\* 2/2017 Naganuma ............. G06N 20/00
2019/0019104 A1\* 1/2019 Liu ........................ G06F 9/46

\* cited by examiner

DISTRIBUTED MACHINE LEARNING ON HETEROGENEOUS DATA PLATFORMS

BACKGROUND

Unless otherwise indicated herein, the approaches described in this section are not prior art to the claims in this application and are not admitted to be prior art by inclusion in this section.

Machine learning is the process of building statistical models for business decision making—such as prediction of future variable based on historic data (regression), classification of data points, or clustering of data points. Machine learning approaches develop statistical models to convert complex and voluminous datasets into simpler, structured, and approximate representations which extract meaningful patterns or discover the relationships between factors and responses. Machine learning technologies may also involve hyper-parameter optimization to find the model fit based on historic data having the best prediction power.

With the growth of data in both number of observations (records) and parameters of machine learning models (e.g., deep neutral network), decentralized storage of datasets as well as distributed (scale-out) machine learning solutions have become available. However, the data are usually stored in different data platforms.

Solving machine learning problems typically calls for large-scale access to that data across data platforms. For the cross data platform scenario mentioned above, typical approaches move the data to single data platform, a resource-consuming process.

SUMMARY

A distributed machine learning framework may be implemented with heterogeneous data platforms. The framework may comprise a configuration component, a persistency component, a proxy repository, and a machine learning execution component. The configuration component includes information (e.g., platform identity, data format) relevant to the specific data platforms. The proxy repository includes predefined proxies for communication between heterogeneous data platform nodes and execution of the machine learning procedure. The persistency component manages the storage of data and the model trained by machine learning.

The machine learning execution component comprises three layers. A bottom work node layer within the data platform performs most of computations of the machine learning procedure. A middle, per-platform server node layer communicates with the work nodes to coordinate jobs on that data platform. The middle layer aggregates a partial result vector from received computation results of the work nodes, updates partial model parameters stored on the middle layer, and determines convergence data. An upper layer comprises a central server node communicating with the middle layer to coordinate jobs of different data platforms. The upper layer aggregates a result vector from the received partial result vectors, updates common model parameters, and determines convergence from received convergence data.

A computer-implemented method according to an embodiment comprises sending to a first server node of a first data platform, a first request to collect a first partial result vector regarding a first parameter of a training set. The first partial result vector computed by a first work node from data stored in the first data platform, is received from the first server node. A second request to collect a second partial result vector regarding a second parameter of the training set, is sent to a second server node of a second data platform. The second partial result vector computed by a second work node from data stored in the second data platform, is received from the second server node. The first partial result vector and the second partial result vector are aggregated to create a result vector including an updated first parameter and an updated second parameter. The result vector is sent to the first server node and to the second server node. Convergence data calculated by the first server node from the updated first parameter, and calculated by the second server node from the updated second parameter, is received. A convergence is received from the convergence data. Where the convergence is found, a model trained according to the result vector is stored in a persistence component.

Certain embodiments further comprise referencing training set partition information from a configuration component to determine a location of the first parameter in the first data platform.

Some embodiments further comprise referencing configuration information from a configuration component to determine a data format of the first data platform.

Particular embodiments further comprise referencing a predetermined statement from a proxy repository to send the first request.

According to various embodiments, the determining is performed by an in-memory database engine.

In some embodiments the first data platform comprises an in-memory database.

In particular embodiments the second data platform comprises other than an in-memory database.

According to certain embodiments the first partial result vector represents a gradient.

In some embodiments the first parameter and the second parameter comprise mutually disjoint sets.

According to various embodiments the first parameter and the second parameter are based upon logistic regression.

A non-transitory computer readable storage medium embodies a computer program for performing a method comprising referencing a proxy repository to obtain a first predetermined request statement, and sending to a first server node of a first data platform, the first predetermined request statement to collect a first partial result vector regarding a first parameter of a training set. The first partial result vector computed by a first work node from data stored in the first data platform, is received from the first server node. The proxy repository is referenced to obtain a second predetermined request statement. The second predetermined request statement to collect a second partial result vector regarding a second parameter of the training set, is sent to a second server node of a second data platform. The second partial result vector computed by a second work node from data stored in the second data platform, is received from the second server node. The first partial result vector and the second partial result vector are aggregated to create a result vector including an updated first parameter and an updated second parameter. The result vector is sent to the first server node and to the second server node. Convergence data calculated by the first server node from the updated first parameter, and calculated by the second server node from the updated second parameter, is received. Convergence is determined from the convergence data. Where the convergence is found, a model trained according to the result vector is stored in a persistence component.

An embodiment of a computer system comprises one or more processors and a software program executable on said computer system. The software program is configured to cause an engine of an in-memory database to send to a first server node of a first data platform, a first request to collect a first partial result vector regarding a first parameter of a training set, and to cause the in-memory database engine to receive from the first server node, the first partial result vector computed by a first work node from data stored in the first data platform. The software program is further configured to cause the engine to send to a second server node of a second data platform, a second request to collect a second partial result vector regarding a second parameter of the training set. The software program is further configured to cause the engine to receive from the second server node, the second partial result vector computed by a second work node from data stored in the second data platform. The in-memory database engine aggregates the first partial result vector and the second partial result vector to create a result vector including an updated first parameter and an updated second parameter. The in-memory database engine sends the result vector to the first server node and to the second server node, and receives convergence data calculated by the first server node from the updated first parameter, and calculated by the second server node from the updated second parameter. The in-memory database engine determines convergence from the convergence data. Where the convergence is found, the in-memory database engine stores in the in memory database, a model trained according to the result vector.

The following detailed description and accompanying drawings provide a better understanding of the nature and advantages of embodiments.

DETAILED DESCRIPTION

Described herein are methods and apparatuses implementing distributed machine learning. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
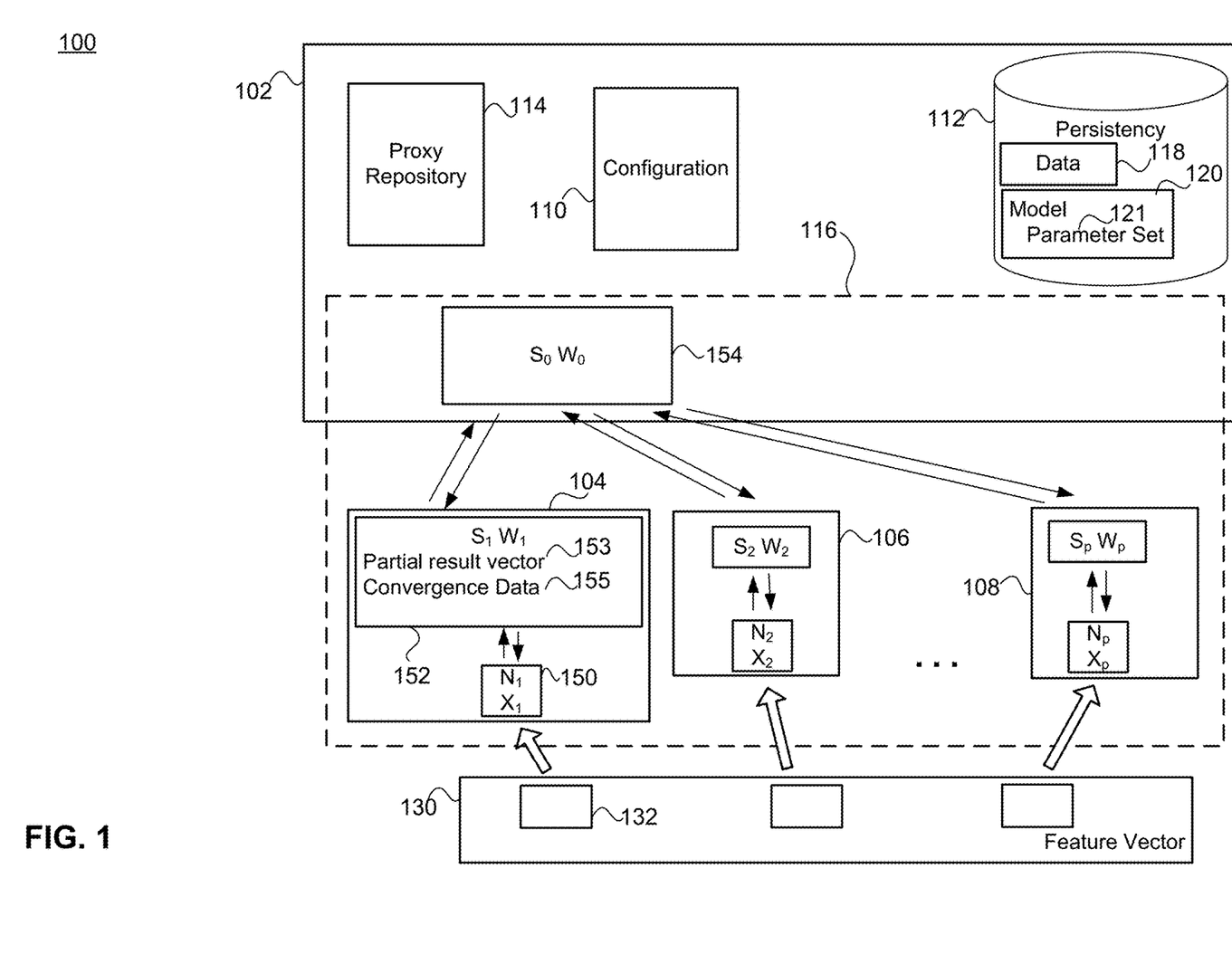
FIG. 1 shows a simplified diagram of a system according to an embodiment.

FIG. 1 shows a simplified view of a system configured to implement resource analysis according to an embodiment. Specifically, system 100 comprises framework engine 102 that is configured to perform machine learning utilizing a training data set that is distributed across heterogeneous data platforms 104, 106, and 108.

In particular, the framework engine comprises a configuration component 110, a persistency component 112, a proxy repository 114, and a machine learning execution component 116. The configuration component includes information to set up the system and allow interaction with the heterogeneous data platforms. The configuration component may identify the different data platforms and include information such as resource/IP address of nodes on each platform. This component may provide parameters of chosen machine learning procedures, and locations for data and trained model/predictive result storage.

The proxy repository includes predefined proxies for communication between heterogeneous data platform nodes and execution of the machine learning procedure. When working with heterogeneous data platforms, characteristics such as operating systems, programming language, and function APIs may be different on each platform. The proxy repository includes platform-specific implementations for each function needed on each platform. For example, the proxy repository may store a statement sending name and necessary input of a function to be executed on a target node. The result returned by the function will be sent back to and stored on the source node.

The persistency component manages storage of data 118 and of the model 120 trained by machine learning. Examples of data which may be stored by the persistency component include a mapping of the location of particular features of the data set to different data platforms. Once the machine learning model is trained, parameters 121 of the model may be stored on a corresponding server node at the location maintained by this persistency component.

While the particular embodiment of FIG. 1 shows the persistence component as separate from the heterogeneous data platforms, this is not required. In alternative embodiments the persistence component could be implemented as part of one of the heterogeneous data platforms (e.g., an in memory database). Moreover, alternative embodiments may feature one or more functions of the various components being performed within persistence layer, for example as executed by the engine of an in-memory database.

The machine learning execution component of the platform engine is now described. As described above, data of the training set used for machine learning may be split according to feature and distributed stored on different platforms.

Specifically, training data is in the form of feature vector 130 comprising partial feature vectors 132. That feature vector is divided and distributed to different platforms.

Inside each data platform, partial feature data is further split by sample and distributed stored on different work nodes. For different platforms, the data format may vary and should match the format of that corresponding platform.

Thus in FIG. 1 the machine learning execution component comprises three layers. A bottom work node layer 150 within the data platform performs most of computations of the machine learning procedure. Here, N represents the particular work node and X represents data of the work node.

A middle server node layer 152 comprises one server node per data platform. That middle server node layer communicates with the work nodes to coordinate jobs on that data platform, and aggregates a partial result vector 153 from computation results of the work nodes on that platform. Here, S represents a server node of the data platform, and $W_n$ represents partial model parameters stored on that data platform. The middle layer is also responsible for updating partial model parameters stored on it, and determining convergence data 155 from updated partial model parameters.

Finally, an upper master server layer 154 comprises a central server node communicating with server nodes and coordinating jobs of the different platforms. Here $S_0$ represents the central server node, and $W_0$ represents common model parameters. The master server layer is responsible for aggregating partial result vectors into a result vector, updating common model parameters, and determining convergence from the convergence data received from the middle layer.

Figure 2:
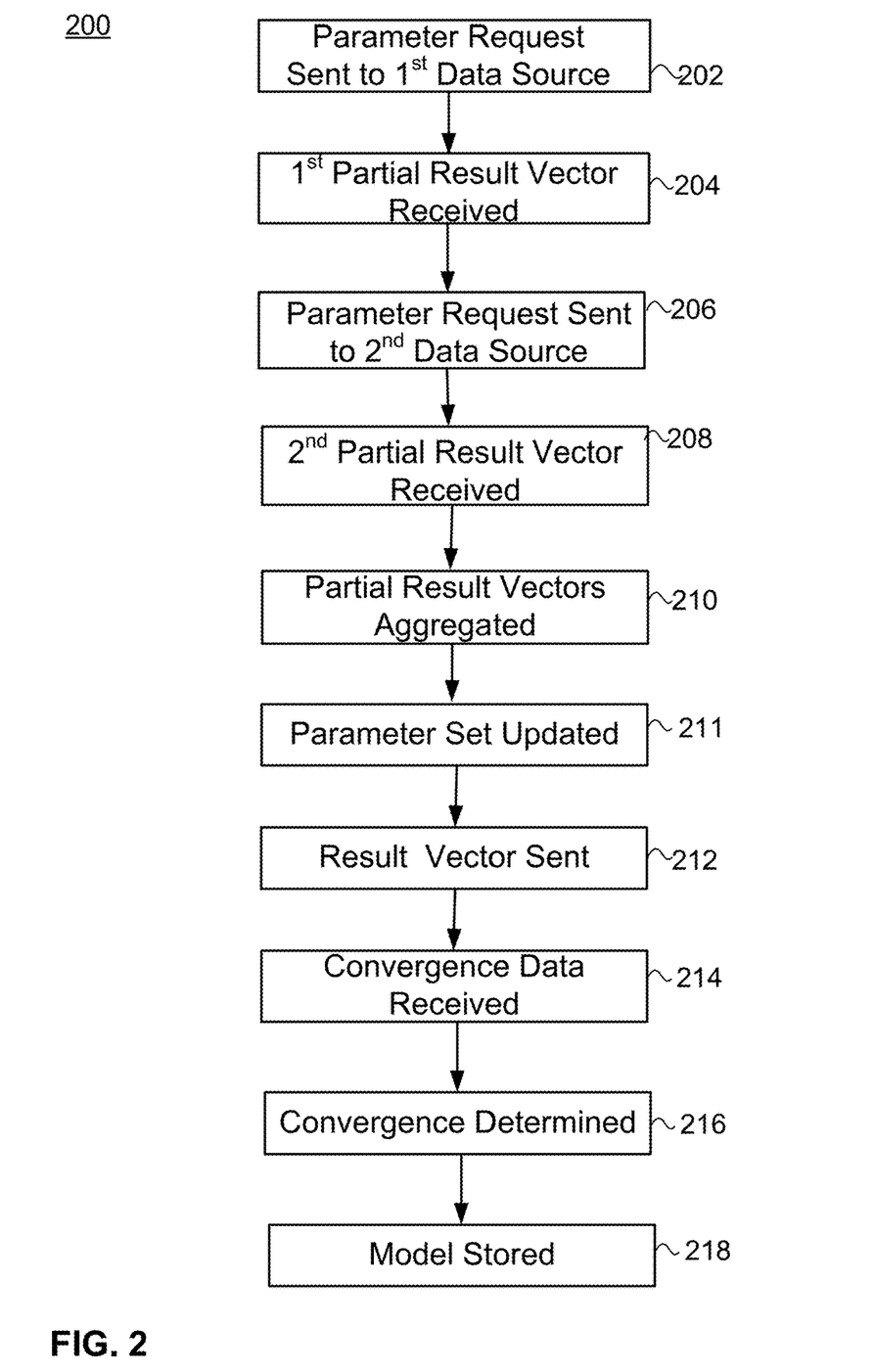
FIG. 2 shows a simplified flow diagram of a method according to an embodiment.

FIG. 2 is a flow diagram showing various actions taken in accordance with an embodiment. Specifically, at 202 a central server node sends to a first server node of a first data platform, a first request to collect a partial result vector regarding a first parameter of a data set partitioned across a plurality of heterogeneous data platforms. The location of the first parameter in the first data platform, and data format information of that platform, may be based upon a configuration component of the framework. The request may be based upon a pre-defined statement from a proxy repository component of the framework.

At 204, the central server node receives from the first server node, a first partial result vector computed by a first work node from data stored in the first data platform.

At 206 the central server node sends to a second server node of a second data platform, a second request to collect a partial result vector regarding a second parameter. At 208, the central server node receives from the second server node, a second partial result vector computed by a second work node from data stored in the second data platform.

At 210, the central server node aggregates the first partial result vector and the second partial result vector to create a result vector including information needed to update the first parameter and the second parameter. At 211 the central server node updates a common parameter set of the model based upon information of the result vector.

At 212 the central server node sends the result vector to the first server node and to the second server node. Information of this result vector allows the first server node and the second server node to update the first parameter and the second parameter, respectively.

At 214 the central server node receives convergence data calculated by the first server node from an updated first parameter based upon the result vector, and calculated by the second server node from an updated second parameter based upon the result vector. At 216, the central server node determines convergence from the convergence data. If convergence is determined, at 218, a model trained by the result vector is stored in a persistence component.

Figure 3:
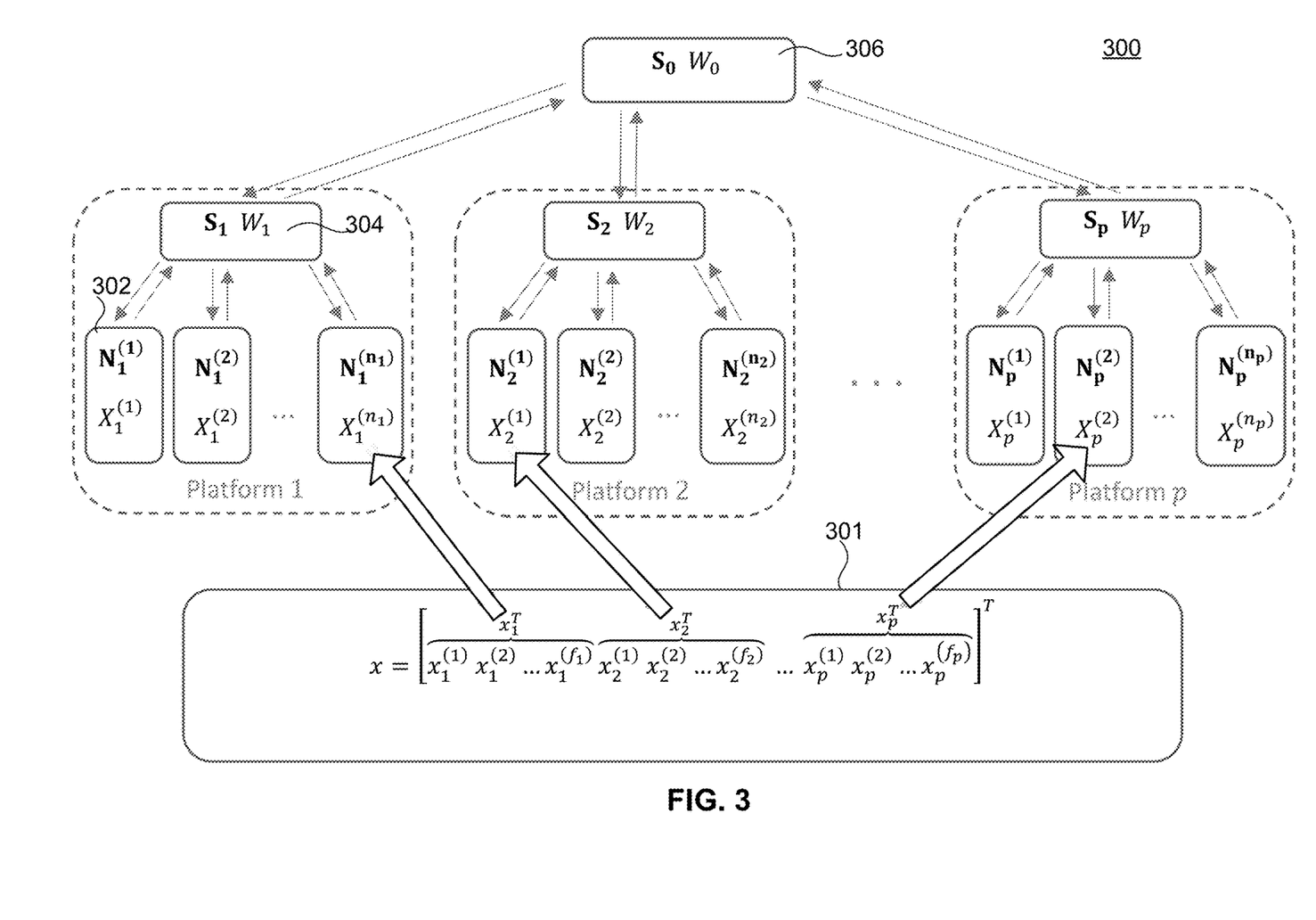
FIG. 3 shows a simplified view of an architecture configured to perform machine learning with training data distributed over a number of heterogeneous data platforms.
Figure 4:
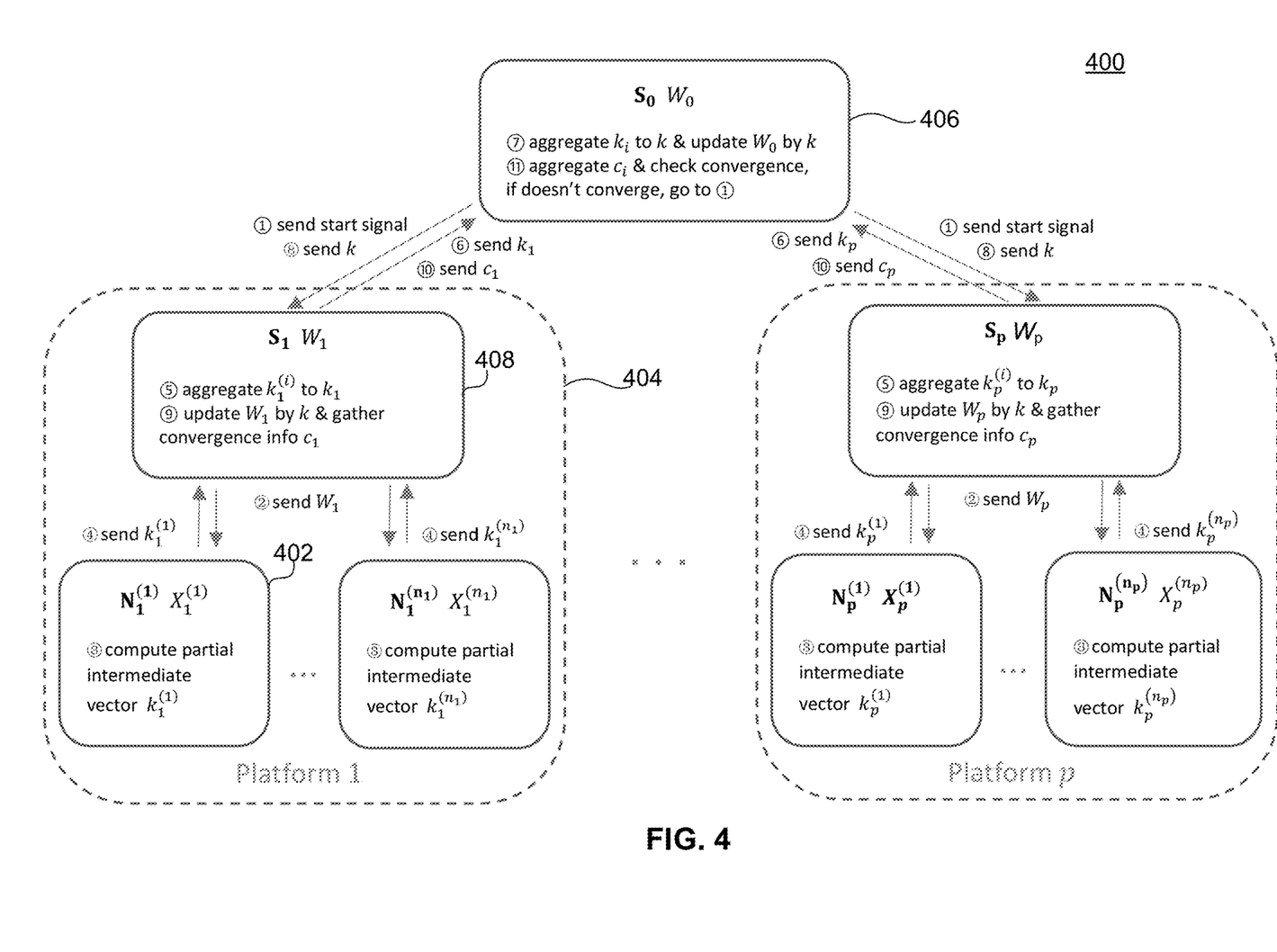
FIG. 4 is a simplified flow diagram showing an iteration procedure according to an embodiment.
Figure 5:
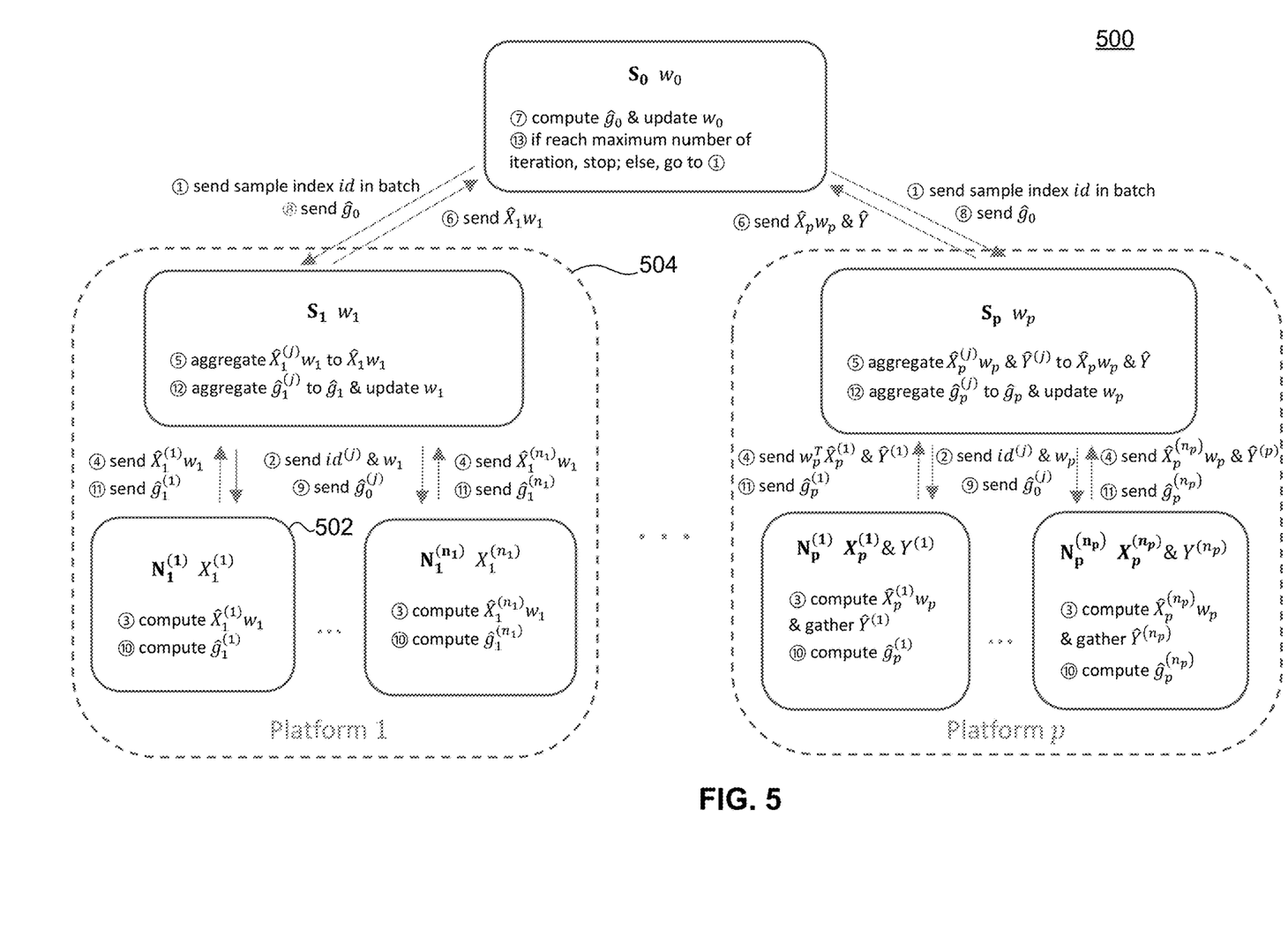
FIG. 5 is a work flow showing the use of batch stochastic gradient descent to solve a logistic regression machine learning problem according to an example.
Figure 6:
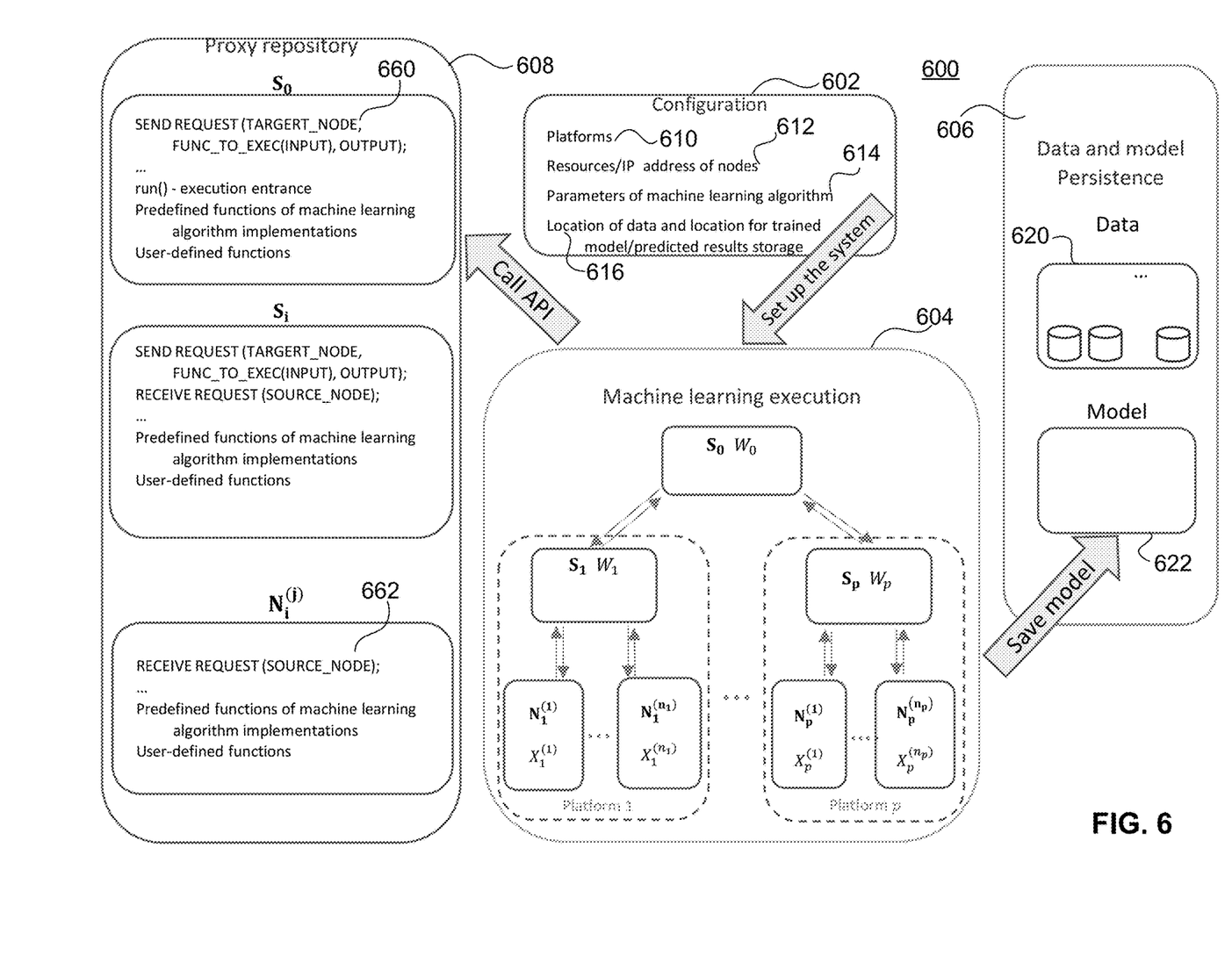
FIG. 6 is a simplified block diagram showing an exemplary system of distributed machine learning framework on heterogeneous data platforms.

Various details of implementing a distributed machine learning framework according to particular embodiments, are now discussed in general in connection with FIGS. 3-4, and specifically in connection with the example of FIGS. 5-6.

A description of a machine learning problem that is addressed according to embodiments, is as follows. Suppose the distributed machine learning problem that is to be solved is based on a training dataset $X \in R^{m \times f}$. A property and difficulty of this problem, is that the dataset X is split by feature (i.e., by column f of X), rather than by sample (i.e., by row m of X), on different platform.

Assume there are p heterogeneous data platforms, and for each platform i, there are $n_i$ work nodes $N_i^{(j)}$, j=1, . . . , $n_i$, on it. An architecture 300 for the distributed storage of X is shown in FIG. 3.

Assume the feature vector 301 $x \in R^f$ is split into $x = [x_1^T x_2^T \ldots x_p^T]^T$, where $x_i = [x_i^{(1)} x_i^{(2)} \ldots x_i^{(f_i)}]^T \in R^{f_i}$ is the partial feature vector, i=1, 2, . . . , p. For each platform i, a partial feature dataset $X_i \in R^{m_i \times f_i}$, which contains $m_i$ samples of $x_i$, is stored on it.

Figure 3A:
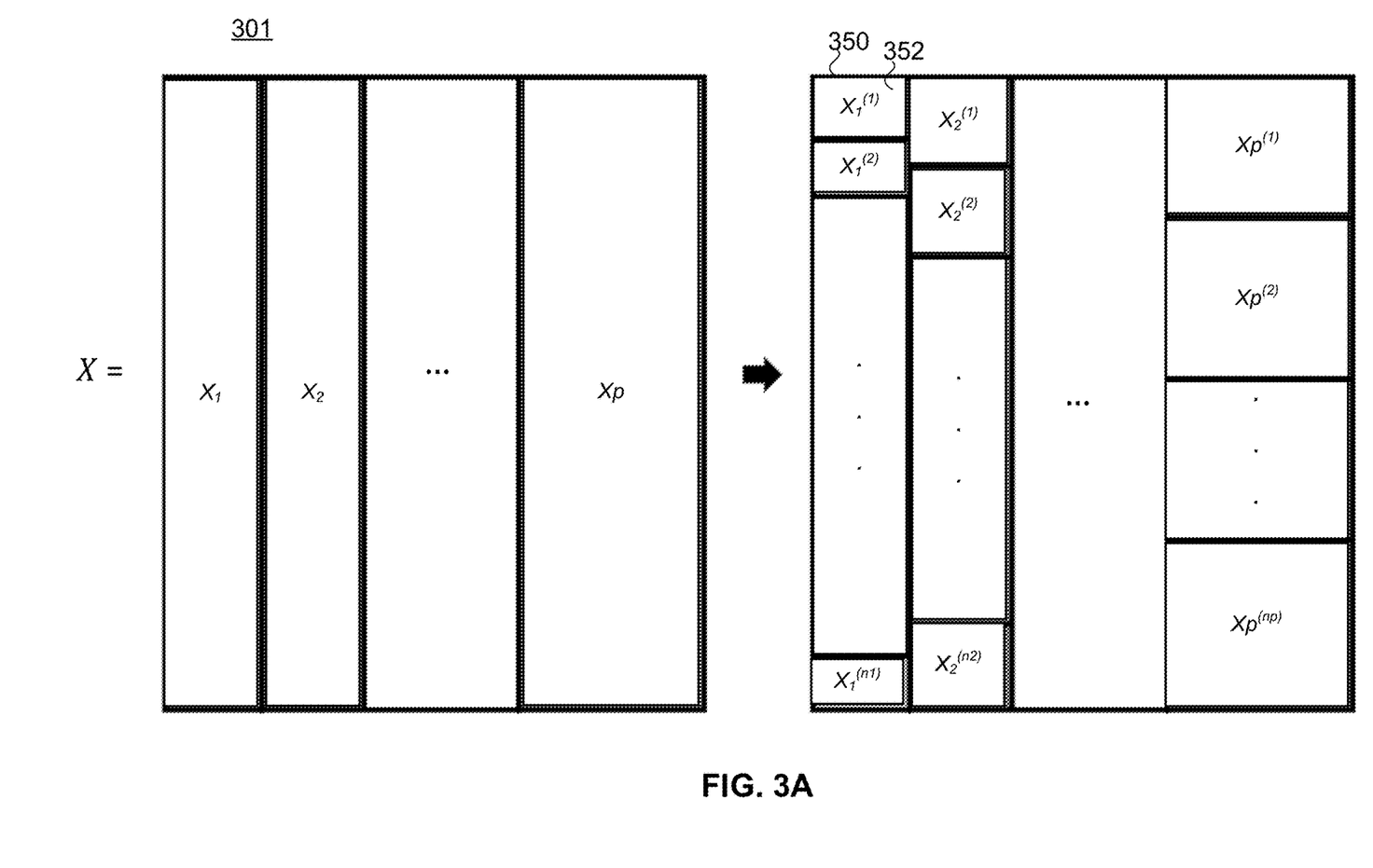
FIG. 3A graphically shows the partitioning of the training data set.

FIG. 3A graphically shows partition of $X \in R^{m \times f}$. Inside each platform, $X_i$ 350 is further split into $n_i$ smaller partition 352 $X_i^{(j)} \in R^{m_i^{(j)} \times f_i}$, j=1, . . . , $n_i$, by sample and each partition $X_i^{(j)}$ is stored on the corresponding work node $N_i^{(j)}$.

With these distributed partitions of X, a machine learning problem may be to train a model (i.e., parameters of the model) from them. Here, solving the machine learning problem is sought to be achieved without moving or copying all the data partitions together into one same platform, while exploiting compute resources of all the work nodes.

In the generalized architecture 300 of FIG. 3, $S_i / N_i^{(j)}$ denotes server/work node, and $W_i / X_i^{(j)}$ denotes corresponding parameters/data stored on it.

At the bottom of the architecture is the work node layer 302 comprising the work nodes. Each work node includes part of the dataset X, and these work nodes perform most of the computation. This lowest layer can directly communicate with the overlying server node layer, execute requests from it and send back the result.

Above the work node layer is the server node layer 304. On each platform i, there is a server node $S_i$, which stores and updates model parameters during runtime, and plays the role of coordinating work nodes on that platform. Like the dataset, the model is also split by feature and distributed on different platforms (i.e., on each server node $S_i$). Denoting the set of all model parameters by W, it is assumed that W can be split into p+1 mutually disjoint sets, i.e.:

$$W = W_0 \cup W_1 \cup W_2 \cup \ldots \cup W_p, W_i \cap W_j = \emptyset, i,j = 0, 1, \ldots, p, i \neq j, \text{where:}$$

$W_i$ is the set of all the parameters that related to $x_i$, i=1, . . . , p, and $W_0$ is the set of common parameters not related to any specific $x_i$ but needed to be shared during training of the model (for example the bias term in Support Vector Machine—SVM).

Actually, many machine learning models do satisfy this assumption. For example, the model parameters of K-Means are k cluster center points, which have common format with the feature vector and can be naturally divided into p partitions through the way the feature vector is split. The situation is similar in most linear models, such as the logistic regression in the example described further below.

At the top is a layer with a single overall server node $S_0$ 306, which communicates with each $S_i$ and coordinates jobs of different platforms. The common parameter set $W_0$ above is stored and updated on $S_0$ during runtime.

The above describes storing split, feature related parameters on server nodes $S_i$ on each different platform (instead of storing all the parameters on a single server node or cluster of multiple server nodes). There are at least two reasons for this.

On one hand, since the data is split by feature on each platform, splitting parameters also by feature makes sure of that all work nodes on the same platform i only need to communicate with a single server node $S_i$. This desirably reduces frequency of communication.

On the other hand, usually nodes of different platforms are at different locations. And sometimes, they are fay away from each other. Meanwhile, different platforms have different data formats and APIs. All these make communication across platforms cost much more time than communication within a platform.

Keeping the server node $S_i$ inside each platform i can minimize communication across platforms through the overall server node $S_0$ and makes most of the data transfer locally inside the platform. This reduces the time cost of each communication.

The following offers a summary of the characterization and responsibilities of each kind of node:

a. Central server node $S_0$:
  Description: communicates with server nodes $S_i$ and coordinates jobs of different platforms;
  Storage: $W_0$;
  Response of: i) send requests to/aggregate results from $S_i$; ii) update $W_0$.
b. Server nodes $S_i$:
  Description: communicates with work nodes $N_i^{(j)}$ and coordinates jobs on platform i;
  Storage: $W_i$;
  Response of: i) execute request from/send results to $S_0$; ii) send requests to/aggregate results from $N_i^{(j)}$; iii) update $W_i$.
c. Work nodes $N_i^{(j)}$:
  Description: most of the computation is done by work node;
  Storage: $X_i^{(j)}$;
  Response of: execute requests from/send results to $S_i$.

A work flow to solve the machine learning problem just described, is now provided. For most machine learning procedures, the model is trained by minimizing a cost function. Minimization of the cost function is usually obtained by iteration procedures.

Given the three-level architecture and the responsibilities of nodes as defined above, one step of a simplest common iteration procedure 400 can be described in FIG. 4.

Specifically in FIG. 4 the feature vector k and the partial vectors $k_i$, $k_i^{(j)}$ represent the intermediate information to be communicated among the work nodes 402, on same or different platforms 404. In the stochastic gradient descent described in the example below, these vectors/partial vectors usually represent the gradients and maybe some extra intermediate results needed to compute the gradients. Hence, these vectors need to be aggregated and resent to corresponding nodes.

In the work flow of FIG. 4, information is sent and aggregated from bottom to top. After gathering all the necessary information from different platforms, $S_0$ 406 will aggregate that information and use the result to update $W_0$. The result is then resent to each $S_i$ 408 so that they can update $W_i$. Next, each $S_i$ will send corresponding convergence information to $S_0$ and $S_0$ gather these information to see if the machine learning procedure is converged.

It is noted that FIG. 4 shows only a simplified example of an interaction workflow. In practice there may be more intermediate results, and hence more communication involved in the procedure.

EXAMPLE

A working example involving machine learning by logistic regression, is now described. In this particular embodiment, a system architecture uses batch stochastic gradient descent in order to solve a logistic regression problem.

Logistic regression is a binary classifier that has achieved success in many fields. Given a data set with m samples $(y(j), x(j))$, $j=1, \ldots, m$, where $x(j) \in R^f$ is the feature vector of the j-th sample, $y(j) = \pm 1$ is the corresponding label.

Logistic regression tries to train a model from the data set and use the model to predict the probabilities of future samples belonging to certain labels. The model of logistic regression is:

$$\begin{cases} P(y=1) = h(w^T x + w_0) \\ P(y=-1) = 1 - h(w^T x + w_0) \end{cases},$$

where $$h(\theta) = \frac{1}{1+e^{-\theta}}$$

is the logistic function, $w_0 \in R$, $w \in R^f$ is the bias term and the parameter vector.

To decide the bias and parameters of this model, we try to maximum the log-likelihood of the data under the parameters, which is equivalent to solving the following optimized problem:

$$\min_w f(w) = \sum_{j=1}^m \log h(y(j)(w^T x(j) + w_0)).$$

Batch stochastic gradient descent is chosen to solve the above problem. Notice that update formula of one step of batch stochastic gradient descent in logistic regression is:

$$w_0(t+1) = w_0(t) + \sum_{j \text{ in batch}} \frac{y(j)\eta}{1 + e^{y(j)(w(t)^T x(j) + w_0(t))}},$$

$$w(t+1) = w(t) + \sum_{j \text{ in batch}} y(j)x(j)\left(\frac{\eta}{1 + e^{y(j)(w(t)^T x(j) + w_0(t))}}\right),$$

where $w_0(t) \in R$, $w(t) \in R^f$ is the bias term and the parameter vector at step t, and $\eta$ is a constant represents step size.

The feature vector x is assumed to be divided as:

$$x = \left[\overline{x_1^{(1)} x_1^{(2)} \ldots x_1^{(f_1)}} \overline{x_2^{(1)} x_2^{(2)} \ldots x_2^{(f_2)}} \ldots \overline{x_p^{(1)} x_p^{(2)} \ldots x_p^{(f_p)}}\right]^T.$$

Correspondingly, the parameter set $W = \{w_0, w\}$ can be divided into:

$$W_0 = \{w_0\}, w = \left[\overline{w_1^{(1)} w_1^{(2)} \ldots w_1^{(f_1)}} \overline{w_2^{(1)} w_2^{(2)} \ldots w_2^{(f_2)}} \ldots \overline{w_p^{(1)} w_p^{(2)} \ldots w_p^{(f_p)}}\right]^T.$$

To ensure the machine learning execution on the system architecture runs correctly and efficiently, the following assumptions are made.

It is assumed that for every partial sample $x_i$, $i=1, \ldots, p$, of a complete sample x, there is a corresponding unique index stored on each platform, so that we are able to find corresponding partial sample $x_i$ of x on each platform only by this sample index.

It is also assumed that for each platform, partial samples are randomly distributed on each work nodes of that platform, so that in one batch, task on each work node will be generally balanced.

Last, without loss of generality, it is assumed that the label information of the samples is stored in platform p. The work flow of using batch stochastic gradient descent to solving this logistic regression problem is shown in FIG. 5.

The vector id in the workflow 500 of FIG. 5 contains sample indexes of the corresponding samples in the current batch, while hat over a matrix or vector denotes it is corresponding to the current batch. For example, $\hat{X}_i^{(1)}$ denotes the matrix comprising samples whose index is in $id^{(1)}$, where $id^{(1)}$ is partial of id which indicates the samples in the current batch that are stored on work node $N_1^{(1)}$ 502. It is assumed that each row in these matrix or vector are sorted by same order according to sample index so that computation between them is consistent.

In (5) the aggregate step simply puts the result of $\hat{X}_i^{(j)} w_i$ together to form a bigger vector $\hat{X}_j w_i$, and so is $\hat{Y}^{(j)}$ to $\hat{Y}$.

In (7)

$$(\hat{g}_0)_k = \frac{(\hat{Y})_k}{1 + e^{(\hat{Y})_k (\sum_{i=1}^p (\hat{X}_i w_i)_k + w_0)}},$$

where $(\bullet)_k$ denotes the k-th element of a vector; $w_0$ can be updated by $w_0 = w_0 + \eta \|\hat{g}_0\|_1$;

In (9) because within each platforms 504, samples in the batch are further distributed stored on different nodes, here $\hat{g}_{o0}$ is divided into $\hat{g}_0^{(j)}$ by sample accordingly and sent to the corresponding work nodes, index indicating platform is omitted here for simplicity.

In (10) $\hat{g}_i^{(j)} = (\hat{g}_0^{(j)})^T \hat{X}_i^{(j)}$.

In (12) the aggregate step is $\hat{g}_i = \sum_{j=1}^{n_i} \hat{g}_i^{(j)}$; $w_i$ can be updated by $w_i = w_i + \eta \hat{g}_i$.

A system of distributed machine learning framework on heterogeneous data platforms according to this particular example, is shown in FIG. 6. That system 600 comprises four main components:

configuration component 602;
machine learning execution component 604;
data and model persistency component 606; and
proxy repository 608.

For the configuration component, before one can use the system, several configurations are set up the system. The configuration should include following information:

specified platforms 610;
resource/IP address 612 of nodes on each platform;
parameters 614 of chosen machine learning procedure;
data location and location for trained model/predictive result storage 616.

Once is this information is provided, the system can start up and move to machine learning execution.

The machine learning execution component has already been extensively described above. After the user sets up the system using the configuration component, the system moves to machine learning execution. During the execution, nodes of the system read data according to the data persistency component, and execute functions implemented in the proxy repository. Once the model is trained, parameters of the model are stored according to the model persistency component.

The data and model persistency component manages the storage of data 620 and the model 622. The data may be split by feature and distributed stored on different platforms. Inside each platform, partial feature data is further split by sample and distributed stored on different work nodes. For different platforms, the data format varies and should match the format of that corresponding platform.

One example of a data platform is the HANA in-memory database available from SAP SE of Walldorf, Germany. On this HANA platform, the data is usually stored in the following table:

| Column | Data Type | Description |
| --- | --- | --- |
| ID | varchar or integer | Sample ID |
| X1 | varchar, integer or double | Attribute 1 |
| ... | varchar, integer or double | ... |
| XN | varchar, integer or double | Attribute N |
| Y(if exists) | varchar, integer or double | response |

After the machine learning model is trained, parameters of the model are stored on corresponding server node at the location maintained by this persistency component.

Details regarding the proxy repository in this example, are now discussed. When working with heterogeneous data platforms, operating systems, programming language and function APIs are likely to be different on each platform. Hence, the proxy repository includes platform-specific implementations for each function needed on each platform.

For each function, the implementations of it on different platforms should have same function name to avoid potential confusion. Generally, the proxy repository contains system predefined statements, functions and other user defined functions that are needed during the execution of machine learning procedures.

For some common platforms (e.g., HANA, HADOOP, SPARK), platform-specific implementations of the predefined statements and functions for each platform may already be available. However, if a user seeks to introduce a new function, platform-specific implementations of that new function for each platform will be needed.

For communication between nodes, several statements may be predefined in the proxy repository. As shown in the specific system of FIG. 6, one example of such a predefined statement 660 is:

SEND REQUEST (TARGET_NODE, FUNC_TO_EXEC (INPUT), OUTPUT)

TARGET_NODE: host name or ip address of the target node;
FUNC_TO_EXEC: name of the function that needed to be executed on target node;
INPUT: input data needed by target node to execute the function;
OUTPUT: memory address on this source node to store the result sent back by target node.

This statement will send name and necessary input of a function to be executed on a target node. The result returned by the function will be sent back to and stored on this source node.

Another example of such a predefined statement 662 is:

RECEIVE REQUEST (SOURCE_NODE)

SOURCE_NODE: host name or ip address of the source node.

This statement is paired with SEND REQUEST. It will keep the node waiting for a request sent from the source node. After receiving the request, the node will execute the request and send back the result to the source node.

There are also predefined functions in the system. One example shown in FIG. 6 is the run ( ) function on $S_0$.

run (func_to_exec)

This function will run on $S_0$ at the very beginning of the machine learning execution. It will first initialize and set up the system architecture with configuration set in the configuration component. And then it will execute the function func_to_exec, which can be a machine learning procedure that has been implemented in the system or any other machine learning function defined by user.

As just mentioned, predefined functions of machine learning procedures may already exist in the proxy repository. Any other variations or procedures implemented by user can also be included in the proxy repository.

Presented below is pseudo code of an implementation of the work flow of this example in using batch stochastic gradient descent optimization method to solve a logistic regression problem.

Pseudo Code on $S_0$:

```
logistic_regression ( ) {
    Initialization;
    For iter_step < max_iteration
        Randomly choose a batch id;
        For i = 1, ..., p - 1
            SEND REQUEST (S_i, compute_Xw (id), X̂_i w_i);
            SEND REQUEST (S_p, compute_Xw (id), {X̂_p w_p, Ŷ});
        Wait and aggregate: compute ĝ_0 according to (7);
        Update: w_0 = w_0 + η||ĝ_0||_1;
        For i = 1, ..., p
            SEND REQUEST (S_i, update_w (ĝ_0), null);
        Store the trained model;
}
```

Pseudo Code on $S_i$:

```
compute_Xw (id) {
    IF platform p
        For j = 1, ..., n_p
            SEND REQUEST (N_p^(j), compute_partial_Xw (w_p),
                {X̂_p^(j) w_p, Ŷ^(j)});
        Wait and aggregate: joint {X̂^(j)_p w_p}_{j=1}^{n_i} & {Ŷ^(j)}_{j=1}^{n_i} to X̂_p w_p &
Ŷ according to (5);
        Return X̂_p w_p & Ŷ;
    ELSE
        For j = 1, ..., n_i
            SEND REQUEST (N_i^(j), compute_partial_Xw (id^(j), w_i),
                X̂_i^(j) w_i);
        Wait and aggregate: joint {X̂^(j)_i w_i}_{j=1}^{n_i} to X_i w_i according to (5);
        Return X̂_i w_i;
}
update_w (ĝ_0) {
    For j = 1, ..., n_i
        SEND REQUEST (N_i^(j), compute_partial_g (ĝ_0^(j)), ĝ_i^(j));
    Wait and aggregate: ĝ_i = Σ_{j=1}^{n_i} ĝ_i^(j);
    Update: w_i = w_i + ηĝ_i;
}
```

Pseudo Code on $N_i^{(j)}$:

```
compute_partial_Xw (id^(j), w_i) {
    IF platform p
        Compute X̂_p^(j) w_p;
        Gather Ŷ^(j);
            Return X̂_p^(j) w_p & Ŷ^(j);
    ELSE
        Compute X̂_i^(j) w_i;
        Return X̂_i^(j) w_i;
}
compute_partial_g (ĝ_0^(j)) {
    Compute ĝ_i^(j) = (ĝ_0^(j))^T X̂_i^(j);
    Return ĝ_i^(j);
}
```

As noted above, embodiments may be configured to work with known heterogeneous data platforms (e.g., HANA, HADOOP, SPARK). However embodiments can also be readily extended to other platforms.

Such merging of a new data platform into the system can involve one or more of:
- adding the new platform and the nodes on it to the system architecture through the configuration component.
- add to the proxy repository the implementation of necessary predefined statements and functions—such as the statement SEND REQUEST( )—for the new platform;
- implement related functions for the new platform to the machine learning component. In this manner, the system can be extended on a variety of different platforms.

Figure 7:
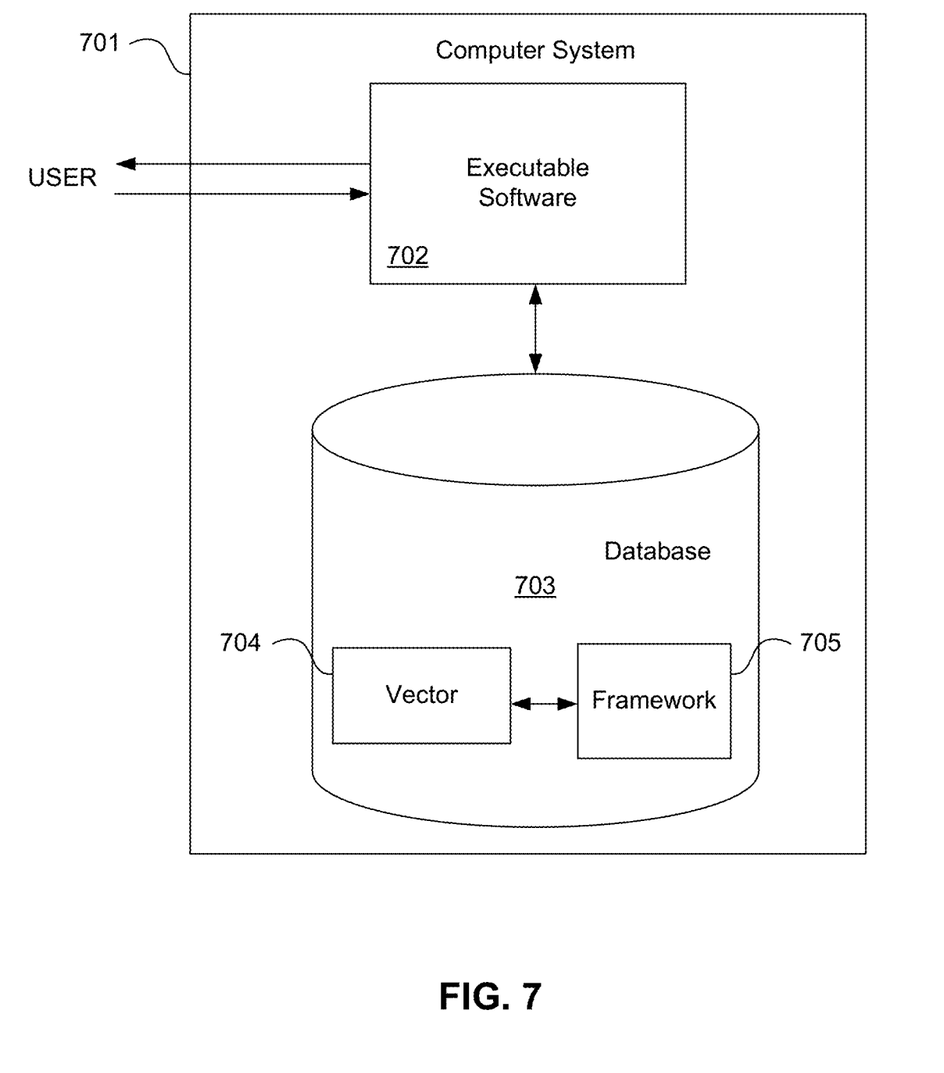
FIG. 7 illustrates hardware of a special purpose computing machine according to an embodiment that is configured to perform distributed machine learning.

FIG. 7 illustrates hardware of a special purpose computing machine configured to implement distributed machine learning according to an embodiment. In particular, computer system 701 comprises a processor 702 that is in electronic communication with a non-transitory computer-readable storage medium comprising a database 703. This computer-readable storage medium has stored thereon code 705 corresponding to a platform. Code 704 corresponds to vector information. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 8:
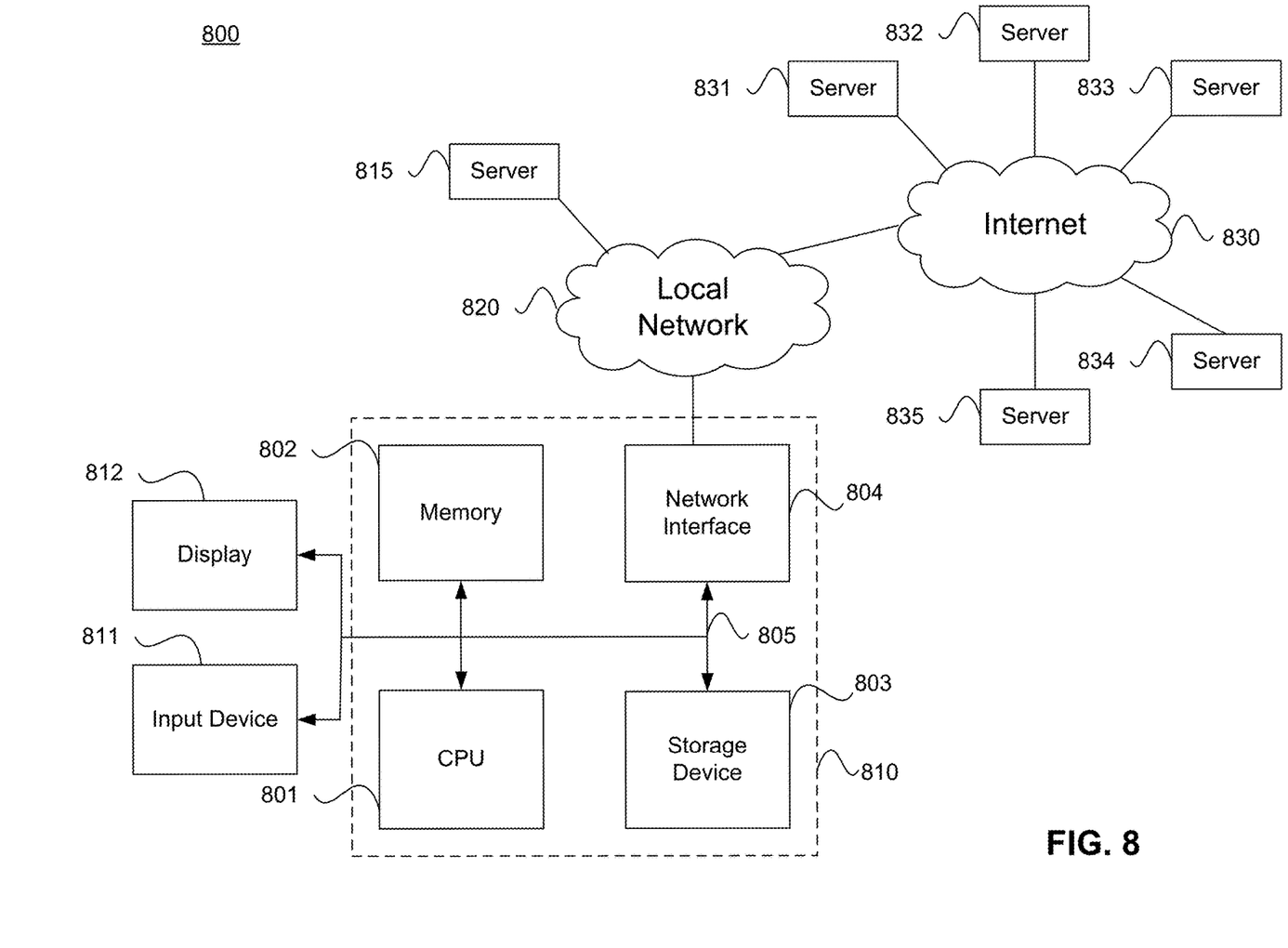
FIG. 8 illustrates an example computer system.

An example computer system 800 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
sending to a first server node of a first data platform, a first request to collect a first partial result vector regarding a first parameter of a training set;
receiving from the first server node, the first partial result vector computed by a first work node from data stored in the first data platform;
sending to a second server node of a second data platform, a second request to collect a second partial result vector regarding a second parameter of the training set;
receiving from the second server node, the second partial result vector computed by a second work node from data stored in the second data platform;
aggregating the first partial result vector and the second partial result vector to create the result vector including an updated first parameter and an updated second parameter, wherein the first partial result vector and the second partial result vector are rows or columns in the result vector;
sending back the result vector to the first server node and to the second server node for processing by the first server node and the second server node;
receiving convergence data calculated by the first server node from the updated first parameter, and calculated by the second server node from the updated second parameter;
a first in-memory database engine of a first in-memory database determining a convergence from the convergence data; and
where the convergence is found, the first in-memory database engine storing in a persistence component of the first in-memory database, a model trained according to the result vector.

2. A method as in claim 1 further comprising:
referencing training set partition information from a configuration component to determine a location of the first parameter in the first data platform.

3. A method as in claim 1 further comprising:
referencing configuration information from a configuration component to determine a data format of the first data platform.

4. A method as in claim 1 further comprising:
referencing a predetermined statement from a proxy repository to send the first request.

5. A method as in claim 1 wherein the first data platform comprises a second in-memory database.

6. A method as in claim 5 wherein the second data platform comprises other than an in-memory database.

7. A method as in claim 1 wherein the first partial result vector represents a gradient.

8. A method as in claim 1 wherein the first parameter and the second parameter comprise mutually disjoint sets.

9. A method as in claim 1 wherein the first parameter and the second parameter are based upon logistic regression.

10. A non-transitory computer readable storage medium embodying a computer program for performing a method, said method comprising:
referencing a proxy repository to obtain a first predetermined request statement;
sending to a first server node of a first data platform, the first predetermined request statement to collect a first partial result vector regarding a first parameter of a training set;
receiving from the first server node, the first partial result vector computed by a first work node from data stored in the first data platform;
referencing the proxy repository to obtain a second predetermined request statement;
sending to a second server node of a second data platform, the second predetermined request statement to collect a second partial result vector regarding a second parameter of the training set;
receiving from the second server node, the second partial result vector computed by a second work node from data stored in the second data platform;
aggregating the first partial result vector and the second partial result vector to create a result vector including an updated first parameter and an updated second parameter wherein the first partial result vector and the second partial result vector are rows or columns in the result vector;

sending back the result vector to the first server node and to the second server node for processing by the first server node and the second server node;

receiving convergence data calculated by the first server node from the updated first parameter, and calculated by the second server node from the updated second parameter;

a first in-memory database engine of a first in-memory database determining convergence from the convergence data; and where the convergence is found, storing in a persistence component of the first in-memory database, a model trained according to the result vector.

11. A non-transitory computer readable storage medium as in claim 10 wherein the method further comprises:

referencing training set partition information from a configuration component to determine a location of the first parameter in the first data platform.

12. A non-transitory computer readable storage medium as in claim 10 wherein the method further comprises:

referencing configuration information from a configuration component to determine a data format of the first data platform.

13. A non-transitory computer readable storage medium as in claim 10 wherein the first partial result vector represents a gradient.

14. A non-transitory computer readable storage medium as in claim 10 wherein the first parameter and the second parameter comprise mutually disjoint sets.

15. A computer system comprising:

one or more processors;

a software program, executable on said computer system, the software program configured to cause an engine of an in-memory database to:

send to a first server node of a first data platform, a first request to collect a first partial result vector regarding a first parameter of a training set;

receive from the first server node, the first partial result vector computed by a first work node from data stored in the first data platform;

send to a second server node of a second data platform, a second request to collect a second partial result vector regarding a second parameter of the training set;

receive from the second server node, the second partial result vector computed by a second work node from data stored in the second data platform;

aggregate the first partial result vector and the second partial result vector to create a result vector including an updated first parameter and an updated second parameter, wherein the first partial result vector and the second partial result vector are rows or columns in the result vector;

send back the result vector to the first server node and to the second server node for processing by the first server node and the second server node;

receive convergence data calculated by the first server node from the updated first parameter, and calculated by the second server node from the updated second parameter;

determine convergence from the convergence data; and where the convergence is found, store in the in memory database, a model trained according to the result vector.

16. A computer system as in claim 15 wherein the software program is further configured to cause the in-memory database engine to:

reference training set partition information from a configuration component to determine a location of the first parameter in the first data platform.

17. A computer system as in claim 16 wherein the software program is further configured to cause the in-memory database engine to:

reference configuration information from a configuration component to determine a data format of the first data platform.

18. A computer system as in claim 16 wherein the software program is further configured to cause the in-memory database engine to:

reference a predetermined statement from a proxy repository to send the first request.

19. A computer system as in claim 16 wherein the first partial result vector represents a gradient.

* * * * *